Figure 1:
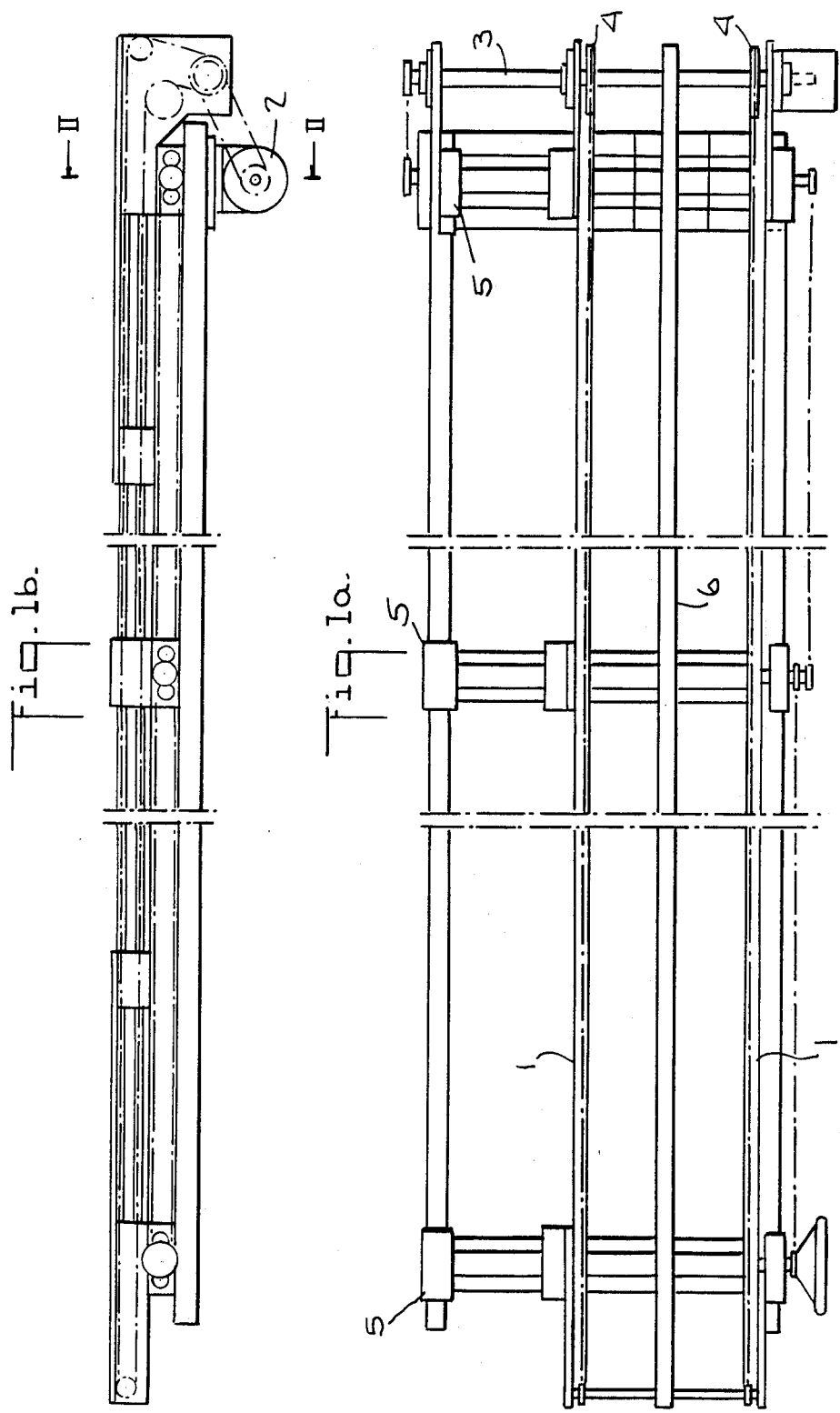

United States Patent [19]

Dieudonnè et al.

[11] Patent Number: 4,978,836
[45] Date of Patent: Dec. 18, 1990

[54] CONTINUOUS OVEN

[75] Inventors: Walter Dieudonnè, Kälberau; Norbert Mittelstädt, Hanau; Kurt Reul, Gründau, all of Fed. Rep. of Germany

[73] Assignee: Heraeus Quarzschmelze GmbH, Hanau, Fed. Rep. of Germany

[21] Appl. No.: 393,993

[22] Filed: Aug. 15, 1989

[30] Foreign Application Priority Data

Dec. 9, 1988 [DE] Fed. Rep. of Germany ....... 3841447

[51] Int. Cl.⁵ .................... F27B 9/06; F27D 11/00
[52] U.S. Cl. .................................. 219/388; 198/626.5
[58] Field of Search ................ 219/388; 198/626, 627, 198/465.3

[56] References Cited

U.S. PATENT DOCUMENTS

| | | | |
|---|---|---|---|
| 1,534,042 | 4/1925 | Tugendhat | 219/388 |
| 2,442,407 | 6/1948 | Gibbons | 219/388 |
| 3,476,840 | 11/1969 | Glassford | 219/388 |
| 3,744,617 | 7/1973 | Herbener | 198/692 |
| 4,667,809 | 5/1987 | Raybuck | 198/627 |
| 4,718,540 | 1/1988 | Greenwell | 198/627 |
| 4,844,231 | 7/1989 | Usui | 198/465.3 |

FOREIGN PATENT DOCUMENTS 2101951 1/1981 United Kingdom ................ 198/627

Primary Examiner—Teresa J. Walberg
Attorney, Agent, or Firm—Felfe & Lynch

[57] ABSTRACT

Continuous ovens are known including heat radiators, especially electrical infrared radiators for the thermal treatment of thin, plate-like components, especially printed circuit boards fitted with electronic components, including a conveying device which has two spaced-apart, parallel, synchronously driven continuous drive bands each having support elements for the plate-like components. In order to make a continuous oven including a conveying device wherein the printed circuit boards to be soldered are carried through the oven on a defined plane in their entire structural length such that the structural changes involved do not strongly affect the thermal conditions in the oven, an auxiliary drive band is disposed between the two drive bands and parallel thereto. If necessary, the auxiliary drive band is equipped with projections directed vertically to the band plane of the band which is created by the drive bands and the length of which does not surpass the support surface for the plate-like components formed by the support elements.

14 Claims, 3 Drawing Sheets

CONTINUOUS OVEN

The present invention relates to a continuous oven including heat radiators, especially electrical infrared radiators for the thermal treatment or soldering of thin, plate-like components, especially printed circuit boards fitted with electronic components. The continuous oven preferably includes a conveying device equipped with synchronously driven continuous drive bands which are in a spaced-apart, parallel relationship to each other each having support elements for the plate-like components.

Such continuous ovens, also referred to an infrared ovens for the surface mounting of SMD's (surface mounted Device), are generally known and, for example, described in the product information "INFRADRY CM", infrared continuous ovens, problem solutions for SMD-technology, PIR-B 144 (5C 10.87/N Ku) of the Heraeus Quarzschmelze GmbH INFRAROT. These ovens are provided with a conveyor belt onto which the printed circuit boards are placed to be carried through the oven. These conveyor belts are equipped with two parallel continuous drive bands is form of link chains. Horizontal pins which form articulated axles of the link chain and extended toward the interior so as to project over the link chain simultaneously serve as the supporting elements for the printed circuit board. The guiding chains are driven via gear-wheels and longitudinally supported by guide legs Such ovens can have a structural length of several meters. Infrared radiators in the form of pipes or heating plates are disposed above and/or below this conveyor belt so as to solder the printed circuit boards fitted with the electronic components. The heating of the continuous oven is carried out in several heating zones which feature different heating capacities so as to first continuously heat up the solder for soldering the components to the required temperature and then solder the components. Very high temperatures are reached in the soldering station since the necessary soldering temperature for soldering tin is at approximately between 180° C. to 185° C. The printed circuit boards which are placed onto the drive bands and carried through the continuous oven can have dimensions up to 500 mm. For an even heat-up of the areas to be soldered of the printed circuit boards, it is essential that the printed circuit boards be accurately carried through the oven.

Alternatively to the above described link chains, so-called wire link bands can be used a conveying means whereon the printed circuit boards to be soldered are placed. Such wire link bands have individual metal pins which are linked to each other at the edge and are in a spaced-apart relationship to each other at approximately 10 mm to 15 mm. Due to the multiplicity of these wire link bands the heating zones are strongly affected. However, the advantage of such wire link bonds is to be seen in the fact that they are carried through the soldering oven free of vibration and in an exactly defined plane.

It is an object of the present invention to create a continuous oven including a conveying device which permits carrying printed circuit boards through the oven in a defined plane in the entire structural length such that the structural changes involved do not strongly affect the thermal conditions in the oven.

The object is achieved by disposing an auxiliary drive band between the two drive bands. This auxiliary drive band is provided with projections, vertical to the band plane created by the drive bands and the length of which does not rise over the support surface for the plate-like components which is created by the support elements. The auxiliary drive band supports the printed circuit boards in a defined way so as to prevent bending. Such a conveying device is preferably suitable for printed circuit boards fitted with components on only one side. The printed circuit boards are placed onto the support elements of the drive bands with the side fitted with the components pointed up. The auxiliary drive band is preferably driven by the same drive units as used for the two external drive bands such that a synchronous drive between the auxiliary drive band and the drive bands is ensured. Due to the individual projections of the auxiliary drive band, the printed circuit board has only a point-like support in its center such that the heat transport is practically not hindered and affected. In order to ensure that the printed circuit boards rest on the external support elements despite the center support created by the projections of auxiliary drive band, the projections of the auxiliary drive band should not rise over the support plane created by the support elements. They can end up to, for example, 3 mm below the support plane such that the printed circuit boards, if they are sufficiently stable, can be carried through the continuous oven freely suspended over these projections; if they are bent they are supported directly on the projections of the auxiliary drive band so as to prevent a further bending.

Projections which extend from the auxiliary drive band are preferred, spaced apart preferably by approximately 5 mm to 50 mm in the direction of motion of the drive band such that the printed circuit boards can be placed onto the conveyor belt regardless of the respective position. Rods or pins which have a preferred diameter of 2 mm to 5 mm can serve as projections such that the printed circuit boards are point-like supported on their bottom side. Alternatively to such rods of pins, the projections can be formed by wave-like elevations on the auxiliary band. In connection with such wave-like elevations band should be used which is made of temperature-resistant plastic, e.g. polytetrafluoroethylene which is easy to manufacture and easy to profile. However, the auxiliary drive ba--d can also be a link chain having individual links, similar to the main drive bands, on which the rods or pins are rigidly disposed.

Usually, in such continuous ovens the spacing between the two main-drive bands can be adjusted so as to have the most suitable positions, respectively, with respect to the printed circuit boards to be treated. The auxiliary drive band is to be centered between the two main drive bands, respectively, so as to support the printed circuit boards exactly in the center such that they do not bend. For this purpose an arrangement of the auxiliary drive band is advantageous which permits is auxiliary drive band to be adjusted such that it moves, while adjusting, at half the speed with which a movably disposed main drive band adjusts.

In accordance with the invention, a continuous oven comprises electrical infrared heat radiators for the thermal treatment of plate-like components and a conveying device having two synchronously driven, continuous drive bands spaced-apart to each other in a parallel relationship. Each drive band has support elements for the plate-like components. The oven also includes an auxiliary drive band disposed between the aforesaid two drive bands and parallel thereto and provided with projections which are directed perpendicular to the band plane of the band which is made by the two drive bands and the length of which does not exceed a support surface for the plate-like components made by the support elements.

Also in accordance with the invention, a continuous oven comprises electrical infrared heat radiators for the thermal treatment of plate-like components and a conveying device having two synchronously driven, continuous drive bands spaced-apart to each other in a parallel relationship. Each drive band has support elements for the plate-like components. The oven also includes an auxiliary drive band disposed between the aforesaid two drive bands and parallel thereto. The auxiliary drive band has a flat upright portion which is directed perpendicular to the band plane of the band which is made by the aforesaid two drive bands and the length of which portion does not exceed a support surface for the plate-like components made by the support elements.

Also in accordance with the invention, a continuous oven comprises electrical infrared heat radiators for the thermal treatment of plate-like components and a conveying device having two synchronously driven, continuous drive bands spaced-apart to each other in a parallel relationship. Each drive band has support elements for the plate-like components. The oven also includes an auxiliary drive band disposed between the two drive bands and parallel thereto. The auxiliary drive band comprises a rotating rope having a plane which is directed perpendicular to the plane of the band which is made by the aforesaid two drive bands and having a support portion the length of which does not exceed a support surface for the plate-like components made by the support elements.

For a better understanding of the invention, together with other and further objects thereof, reference is made to the following description, taken in connection with the accompanying drawings, and its scope will be pointed out in the a-pended claims.

Figure 2:
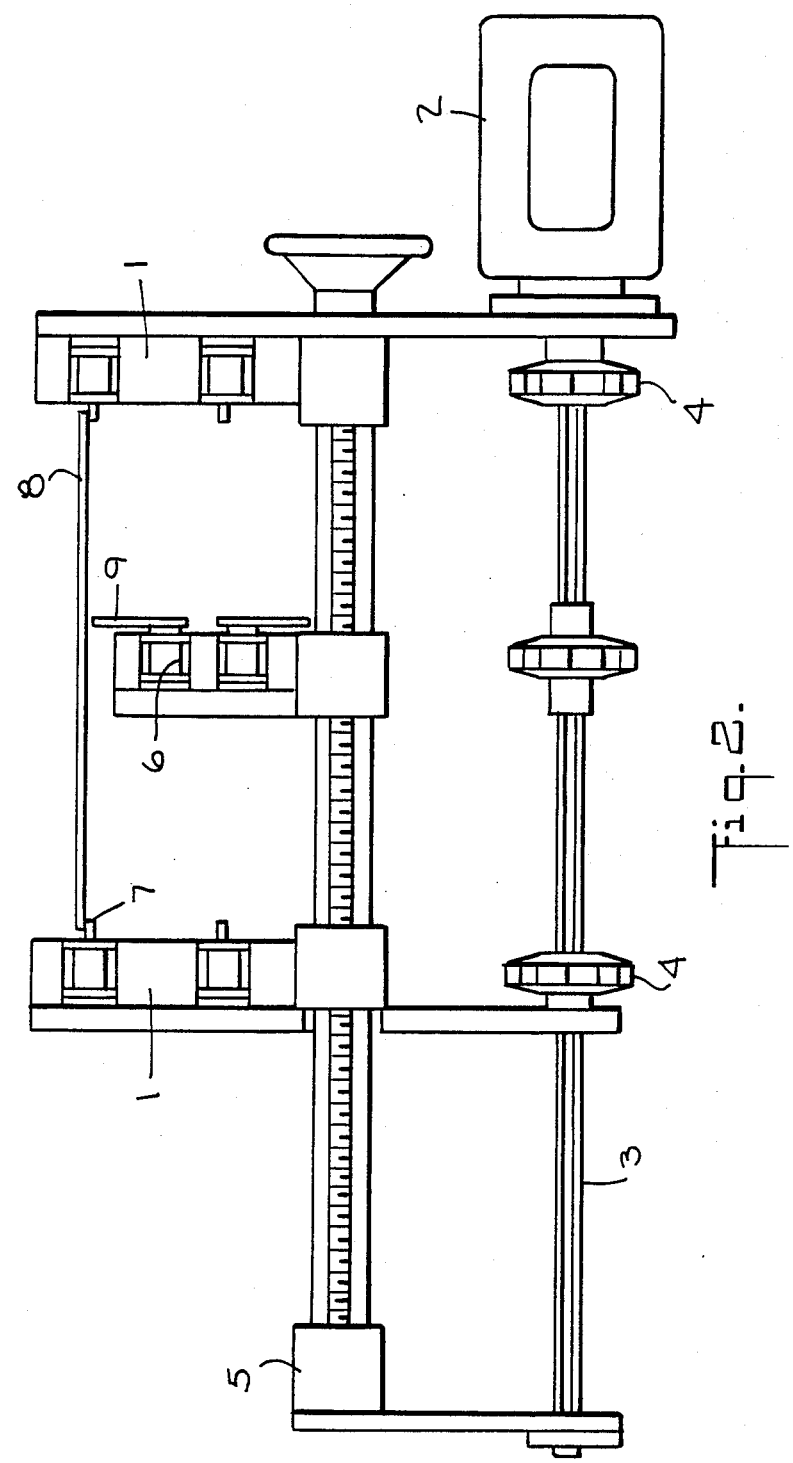

Referring now to the drawings:

FIG. 1a is a top plan view, partly diagrammatic, of the conveyor belt of a continuous oven in accordance with the invention including an auxiliary drive band, FIG. 1b is a side elevational view, partly diagrammatic, of the conveyor belt of FIG. 1a, FIG. 2 is a cross sectional view, partly diagrammatic, taken along line II—II of FIG. 1, and FIGS. 3 to 7 are fragmentary elevational views, partly diagrammatic, of different examples of auxiliary drive bands.

Referring now to FIGS. 1a and 1b, the conveying device as represented in FIG. 1a and 1b has two main drive bands 1 which are configured as continuous link chains and in a parallel relationship to each other. These drive bands are driven via a drive motor 2 on the shaft of which two gearwheels 4 are disposed with torsional strength over which the one drive band and/or the other run, respectively. Over their entire length, the two drive bands 1 are guided by guide units 5. An auxiliary drive band 6 which is driven via shaft 3 operates between the two drive bands 1. As the view in FIG. 2 indicates, the two main drive bands 1 are provided with pin-like support elements 7 which face each other and form a support surface for the printed circuit boards 8 on the top side of the conveying device The printed circuit boards 8 loosely rest on these supporting elements 7 without getting jammed at the lateral edges.

The auxiliary drive band 6 is disposed between the two main drive bands 1 on shaft 3 and the shaft 3 is configured as a splined shaft.

On the top side, the auxiliary drive band is provided with pins or rods 9 which serve as a center support for the printed circuit boards 8. As can be seen in FIG. 2, the pins 9 end slightly below the support surface for the printed circuit boards which is created by the support elements, i.e. they end at a short distance from the bottom side of the print--d circuit boards.

These printed circuit boards can on both sides be fitted with electric or electronic components. The distance between the end of the pins 9 and the bottom side of the printed circuit boards 8 is approximately 1 mm. If the printed circuit boards heat up during the soldering to such an extent that they bend, they contact the pins 9 and are supported.

Figure 3:
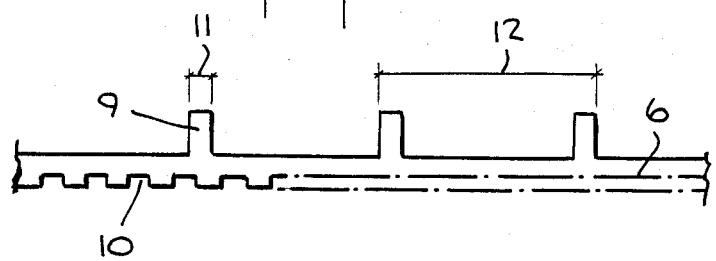
Figure 4:
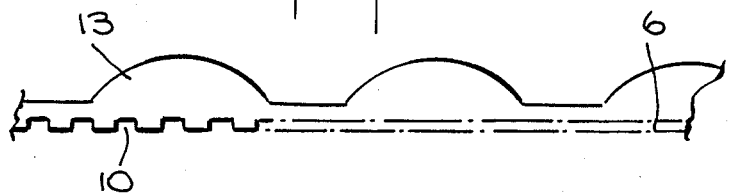
Figure 5:
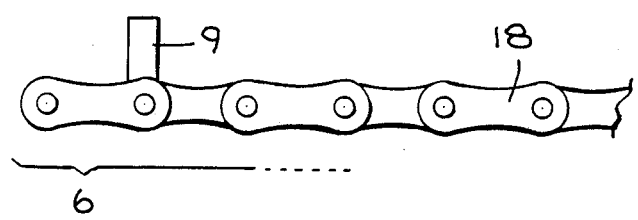

FIGS. 3 to 7 represent different embodiments of the auxiliary band 6. FIG. 5 shows a link chain whereas FIGS. 3 and 4 show drive bands or drive belts in the form of temperature-resistant bands which are profiled. The band represented in FIG. 3 has a toothing 10 on its bottom side whereas rods 9 project on the top side. These rods 9 preferably have a diameter, indicated by the reference character 11, of 4 mm; the average distance 12 between two adjacent rods 9 preferably is approximately 20 mm. The band as shown in FIG. 4 has a wave-like profile on its top side such that the projection or elevations 13 on which the printed circuit boards 8 are supported are formed by the wave crests. Corresponding to the profile of the Teflon band according to FIG. 3, the link chain of FIG. 5 is also provided with pins 9 which are disposed on the individual links 14 of the link chain and pointed up.

Figure 6:
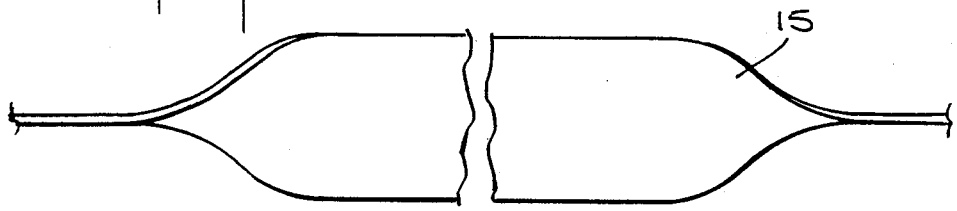

FIG. 6 illustrates the center support which is configured as a vertically disposed metal band. The maximum thickness of the band 15 preferably is 1 mm. At the beginning, the band 15 is vertically positioned via guide rolls and repositioned again at the end so as to be horizontal in order to permit a re-direction.

Figure 7:
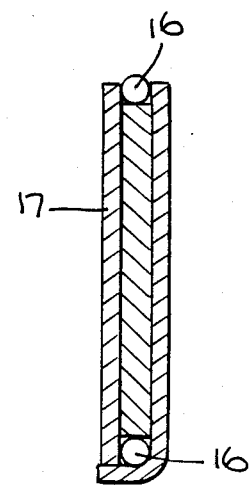

FIG. 7 shows the possibility of supporting printed circuit boards by means of a rope 16 via a guide bar 17.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A continuous oven for heat-treatment of circuit boards with electrical or electronic components to be soldered, comprising:
   an electrical infrared heat radiators for the thermal treatment of plate-like components;
   a conveying device having two synchronously driven, continuous drive band spaced-apart to each other in a parallel relationship, each having support elements for the plate-like components; and
   an auxiliary drive band disposed between said two drive bands and parallel thereto and provided with projections which are directed perpendicular to the band plane of the band which is made by said two drive bands and the length of which does not rise over a support surface for the plate-like components made by said support elements.

2. A continuous oven in accordance with claim 1, in which said projections end, at a maximum, 3 mm below said support surface.

3. A continuous oven in accordance with claim 1, in which said projections, if looked at in the direction of motion of said driven bands, are spaced apart at a distance of 5 mm to 50 mm.

4. A continuous oven in accordance with claim 1, in which the projections are pins.

5. A continuous oven in accordance with claim 4, in which said pins have a diameter of 2 to 5 mm.

6. A continuous oven in accordance with claim 1, in which said projections are formed by wave-like elevations.

7. A continuous oven in accordance with claim 1, in which said auxiliary drive band is a profiled band made of temperature-resistant plastic.

8. A continuous oven in accordance with claim 1, in which said auxiliary drive band is a link chain.

9. A continuous oven in accordance with claim 1, in which said auxiliary drive band can be adjusted in its distance to said two drive bands.

10. A continuous oven in accordance with claim 9, in which at least one of said two drive bands can be adjusted in its distance to the other drive band while said auxiliary drive band can be adjusted simultaneously with the one drive band.

11. A continuous oven according to claim 10, in which said auxiliary drive band moves with half the speed of said one drive band.

12. A continuous oven in accordance with claim 1, in which said auxiliary drive band is centered between said two drive bands.

13. A continuous oven for heat-treatment of circuit boards with electrical or electronic components to be soldered, comprising:
   electrical infrared heat radiators for the thermal treatment of plate-like components;
   a conveying device having two synchronously driven, continuous drive bands spaced-apart to each other in a parallel relationship, each having support elements for the plate-like components; and
   an auxiliary drive band disposed between said two drive bands and parallel thereto, said auxiliary drive band having a flat-upright portion which is directed perpendicular to the band plane of the band which is made by said two drive band and the length of which portion does not rise over a support surface for the plate-like components made by the support elements.

14. A continuous oven for heat-treatment of circuit boards with electrical or electronic components to be soldered, comprising:
   electrical infrared heat radiators for the thermal treatment of plate-like components;
   a conveying device having two synchronously driven, continuous drive bands spaced-apart to each other in a parallel relationship, each having support elements for the plate-like components; and
   an auxiliary drive band disposed between said two drive bands and parallel thereto, said auxiliary drive band comprising a rotating rope having a plane which is directed perpendicular to the plane of the band which is made by said two drive band and having a support portion the length of which does not rise over a support surface for the plate-like components made by the support elements.

* * * * *